United States Patent Office 3,306,636
Patented Feb. 28, 1967

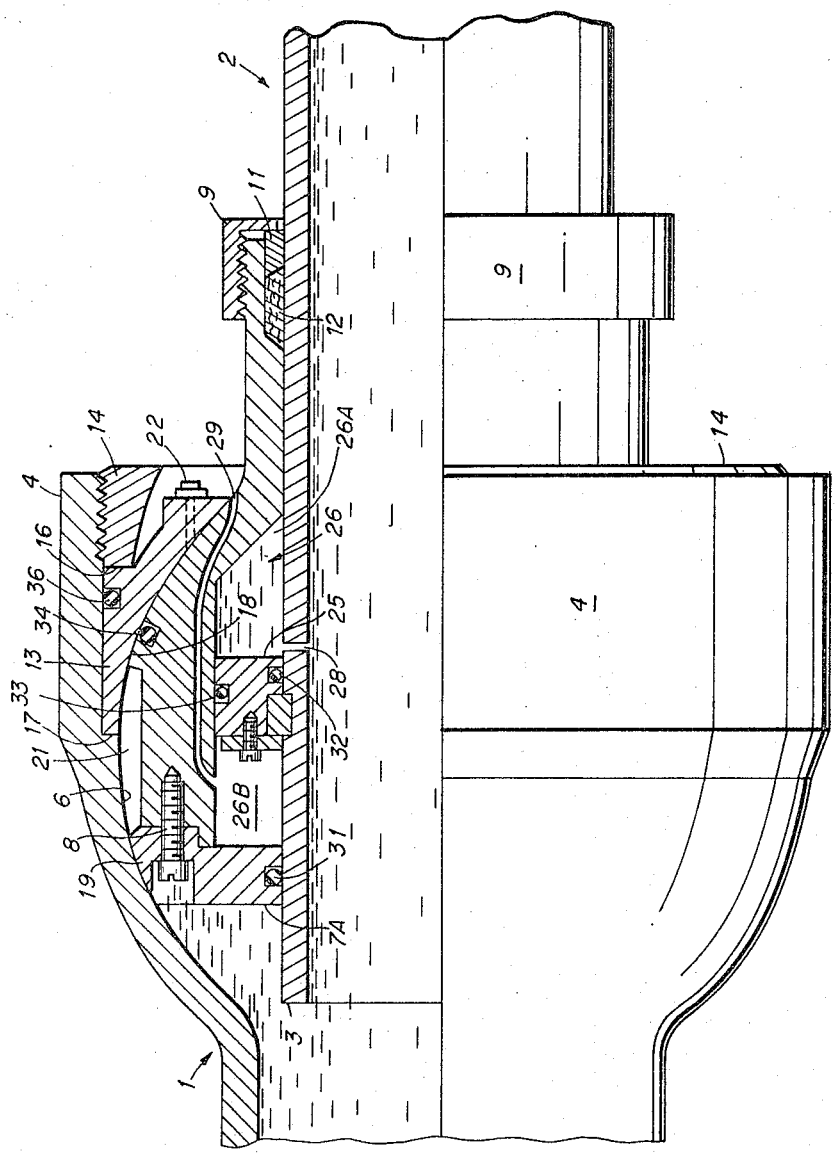

3,306,636
FLEXIBLE PRESSURE-COMPENSATED PIPE COUPLING
Ralph F. Hereth, Port Orchard, Wash., assignor to the United States of America as represented by the Secretary of the Navy
Filed Oct. 12, 1964, Ser. No. 403,416
2 Claims. (Cl. 285—94)

The invention described herein may be manufactured and used by or for the Government of the United States of America for governmental purposes without the payment of any royalties thereon or therefore.

The present invention relates to pipe couplings and, in particular, to flexible pressure-compensated couplings.

When rigid, fluid-carrying pipes are connected together, sudden or heavy variations in the interior fluid pressure frequently may damage and shorten the life of the seals, packings, etc. which the couplings normally require. To avoid the difficulty, attempts have been made to provide sufficient flexibility to absorb the damaging thrust forces principally by permitting a limited amount of relative movement sufficient to relieve torsion or bend forces.

As a related consideration stiffness in an axial direction of the couplings has proven of equal concern and has received equal attention in the art. For example, corrugated bellows or the like have been used, as has the principle of articulation as well as that of telescoping slip joints which usually are formed with sliding seals or packings.

These various expedients have met with varying degrees of success. However, the art does not seem to have provided a simple manner of coupling rigid pipes so as both to minimize mechanical stiffness in twisting or bending directions as well as to fully compensate for axial thrust such as may produce damaging vibrational motion. It, of course, will be recognized that the alleviation of the coupling stiffness is of greater importance in some environments then in others. For example, couplings for submarine salt water lines should have maximum flexibility for reliable and long term use, although, of equal importance such couplings also should be capable of quickly compensating for sudden thrusts so as to avoid vibrational movements which, as will be recognized, constitute a noise source. It is highly important that present day submarines operate in as silent a manner as possible and, of course, any unwanted noise source should be reduced to a minimum.

It is, therefore, an object of the present invention to provide apparatus for coupling together rigid pipes in such a manner as to alleviate mechanical stiffness and compensate for internal pressure thrusts.

A further important object is to provide such apparatus in a simple, reliable and inexpensive manner.

A more particular object is to fully compensate for axial thrusts on the coupling members due to internal fluid pressure variations, and, as subsequently will become apparent, such an object generally is achieved by so directing a portion of the fluid as to produce a force in direct and equal opposition to the increase or decrease of the normal thrust force.

Other objects and their attendant advantages will become more apparent in the detailed description which is to follow.

Although the specific features and details of the invention will be described with reference to the drawings, it can be noted at this point that these objects generally are achieved by employing telescopically-mated male and female coupling members, the male member being provided with an annular, piston-like flange. Also, the interior end portion of the male member is directly exposed to the internal fluid flow through the pipes which the coupling members are intended to connect. The female member, in turn, has an interior chamber in which the piston-like flange of the male member may reciprocate and the piston flange is so disposed as to divide this chamber into two parts one of which is vented to atmosphere and the other exposed to the fluid pressure passing through the pipes.

The arrangement is such that fluid pressure, acting on the end of the pipes to move the male member in one direction, also is bypassed into the fluid chamber of the female member to act against the piston-like flange to urge the male member in the opposite direction. By adjusting the contact areas of the piston and the end of the male member, the thrust forces tending to move the male member in one or the other axial directions are fully compensated.

Further considering the more general aspects of the present coupling apparatus, it is significant to note that the female member preferably is formed of several components the surfaces of which are slidably mated in such a manner that mechanical stiffness in twisting and bending directions is alleviated primarily by the articulated nature of this female member.

The preferred embodiment of the invention is illustrated in the accompanying FIG. 1 drawing which is a side view of the coupling members showing their lower half in elevation with the upper half is diametrically sectioned.

Referring to FIG. 1, it will be noted that the pipe coupling includes female and male members 1 and 2, female member 1 generally having a bell-shape with an interior substantially larger than the diameter of male member 2 so that member 2 is received within member 1 with its end portion 3 directly in the fluid stream. As will be appreciated, members 1 and 2 are intended to couple separate lengths of rigid pipe and these members may be connected to the pipe ends in any known manner.

Considering female member 1 in greater detail, it first is apparent that this member is formed of several parts all of which are secured one to the other so as to be capable of sliding as a unit in an axial direction relative to male member 2. Thus, female member 1 is formed of a bell-flange section 4, the interior which is formed with a smooth arcuate surface 6 on which other members may slide. Fitted into bell-flange 4 is a ball joint member 7 formed of two parts 7A and 7B secured one to the other by a plurality of fitted bolts 8. The ball joint portion of member 7 is received within the bell flange, although it may be noted that portion 7B has a reduced diameter section extending outwardly of bell flange 4 and that this portion has its interior diameter sized to slidably engage the exterior wall of male member 2. To provide an appropriate seal, the end of the reduced diameter portion is threaded to receive a collar 9 which presses a gland 11 against a packing 12 to form a stuffing box arrangement.

Ball joint member 7 is held in place within bell flange 4 by an arcuate collar member 13 and by a nut 14 which, it will be noted, threads into the end portion of bell-flange 4 to press against a radial flange 16 formed on the collar. Also, the interior wall of bell flange 4 is stepped to provide another radial flange 17 against which collar member 13 bears. Preferably, the arrangement is such that the arcuate interior wall portion 18 of collar 13 forms an uninterrupted extension of arcuate interior wall surface 6 of the bell-flange.

Consequently, female member 1 has its several parts 4, 7, 13 and 14 tightly secured together so as to be capable of sliding axially as a unit on male member 2. However, one feature of the invention is that, although female member 2 may move axially as a unit, its components are so mated as to slidably contact one another and permit a type of universal action to relieve mechanical stiffness and permit flexibility both in bending and twisting directions. More specifically, as has been generally noted, the interior surface 6 of bell-flange 4 slidably engages an outer peripheral portion 19 of member 7A, while an interior arcuate portion 18 of collar member 13 slidably engages the arcuate outer peripheral surface of ball joint member 7B. To facilitate the sliding action, it will be noted that member 7 is formed with a groove or recess 21 which primarily reduces frictional engagement. Also, a lubrication fitting 22 is carried by collar member 13 to further reduce friction. Obviously, as twisting or bending moments are received by female member 1 the ball-jointed nature of this female member permits a relative slippage which provides the needed flexibility.

A further important feature of the invention is the manner in which axial thrusts are accommodated or compensated.

A significant structural feature permitting the compensation is the fact that male member 2 is formed with an annular flange 25 so that the entire member acts as a piston. The cylinder for the piston is provided by ball-joint member 7 which, for this purpose, is formed with an interior chamber 26 in which piston flange 25 may reciprocate or vibrate in response to pressure fluctuations. As may be noted, flange 25, is keyed to male member 2 and its outer peripheral surface closely engages the interior wall of chamber 26 to partition the chamber into forward and aft chamber portions 26A and 26B. Further, male member 2 is formed with one or more apertures 28 to admit fluid pressure into chamber portion 26A. Portion 26B, in turn, is vented to atmosphere through a passage 29 formed in ball-joint member 7. Consequently, compensation for fluid pressure changes is provided by permitting the fluid to pass through apertures 28 and act against one side of annular flange 25 to move the flange and male member 2 in an axial direction opposite to that in which member 2 normally would be urged. Thus, for example, a sudden increase in pressure acting upon end surfaces 3 of male member 2 normally would cause member 2 to telescopically slide axially with respect female member 1. However, the same pressure can be applied to the fluid-exposed side of annular flange 25 to urge male member 2 in the opposite axial direction. Therefore fluid pressure compensation can be provided by adjusting the fluid-exposed areas of male member 2 and of annular flange 28 so that equal and opposite pressures are exerted on the surfaces.

It, of course, is necessary to provide appropriate seals at particular locations. For example, chamber portion 26B is sealably protected by oil rings or other appropriate sealing members 31, 32 and 33. Also, fluid may seep into peripheral groove 21 of ball-joint member 7 and it is necessary to contain this fluid within the coupling. For this purpose appropriate seals 34 and 36 may be provided. The previously mentioned stuffing box arrangement at the outer end of female member 1 prevents leakage along male member 2.

The advantages of the present arrangement have been considered in the foregoing description. Of particular significance, the arrangement not only will alleviate the mechanical stiffness in twisting and bending directions, but also compensate for axial thrusts which would tend to telescopically slide one of the coupling members relative to the other. Other arrangements may independently achieve one or the other of these purposes. However, in the present arrangement complete flexibility and pressure compensation is provided in an unusually simple, reliable and effective manner. In particular, the coupling will be found quite acceptable for coupling together lengths of submarine salt water piping.

Obviously many modifications and variations of the present invention are possible in the light of the above teachings. It is therefore to be understood that within the scope of the appended claims the invention may be practiced otherwise than as specifically described.

What is claimed is:

1. Flexible pressure-compensated apparatus for coupling together lengths of fluid-carrying piping, said apparatus comprising, a tubular bell-shaped member having a small diameter rear end portion and a radially-enlarged forward end portion, the interior wall of said forward end portion being formed with a forward cylindrical section and an arcuate rear section having a smooth radius of curvature, a tubular piston member adapted to be coupled to the other of said pipe lengths and having its free end telescopically received within and in spaced relationship with said radially-enlarged portion of the bell-shaped member, a tubular ball-joint member slidably mounted on said piston member, a collar member detachably and adjustably mounted in flush engagement with the forward end of said interior cylindrical wall section of the bell-shaped member, said collar also having an arcuately-formed interior wall providing an uninterrupted continuation of the radius of curvature of said arcuate section of the bell-shaped member, a sealing member disposed between said collar member and said bell-shaped member for sealing said flush engagement, said ball-joint member having an arcuate external wall section fitted to and slidable on said arcuate sections of both the bell-shaped and the collar members, a second sealing member disposed between said interior arcuate wall of the collar member and said arcuate external wall section of the ball-joint member, said ball-joint member also being recessed for forming with said piston member a pressure-compensating cylinder, a piston flange carried by and projecting radially-outwardly of said piston member into said pressure-compensating cylinder for partitioning said cylinder into two chambers, said tubular piston member being provided with aperture means admitting pipe fluid into one of said chambers, vent means for said other chamber, said vent means extending from said other chamber through the ball-joint member to the atmosphere forwardly of said second sealing member, and sealing means for said chambers, said arcuate external wall of the ball-joint member being formed with an elongate circumferentially-continuous groove rearwardly of said second sealing member providing in conjunction with said bell-shaped member and said collar a liquid reservoir, the slidable fitting of said ball-joint member on said bell-shaped member being unsealed for permitting friction-reducing fluid seepage into said reservoir thereby providing a fluid friction reducing film between the sliding fitting of said ball-joint member and bell-shaped member.

2. The apparatus of claim 1 further including a lubrication fitting for lubricating the sliding surfaces of said collar and bell-shaped member at the portion of said collar member disposed forwardly of and external to said second sealing member.

References Cited by the Examiner

UNITED STATES PATENTS

| 909,263 | 1/1909 | Walters | 285—261 X |
| 948,858 | 2/1910 | Henry | 285—166 |
| 1,402,545 | 1/1922 | Springborn | 285—94 |
| 2,421,691 | 6/1947 | Gibson et al. | 285—266 X |
| 2,976,064 | 3/1961 | Croy | 285—266 X |

FOREIGN PATENTS 469,840   8/1937   Great Britain.

CARL W. TOMLIN, *Primary Examiner.*

D. W. AROLA, *Assistant Examiner.*